US012099822B2

(12) United States Patent
Jana et al.

(10) Patent No.: US 12,099,822 B2
(45) Date of Patent: Sep. 24, 2024

(54) METHOD AND SYSTEM FOR IDENTIFYING STATIC ANALYSIS ALARMS BASED ON SEMANTICS OF CHANGED SOURCE CODE

(71) Applicant: Tata Consultancy Services Limited, Mumbai (IN)

(72) Inventors: Anushri Jana, Pune (IN); Ankita Shamrao Khadsare, Pune (IN); Vaidehi Manoj Ghime, Pune (IN); Ramanathan Venkatesh, Pune (IN); Bharti Chimdyalwar, Pune (IN); Shrawan Kumar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 52 days.

(21) Appl. No.: 17/949,390

(22) Filed: Sep. 21, 2022

(65) Prior Publication Data
US 2023/0129536 A1   Apr. 27, 2023

(30) Foreign Application Priority Data
Oct. 22, 2021   (IN) .............................. 202121048304

(51) Int. Cl.
G06F 8/41   (2018.01)
G06F 8/71   (2018.01)

(52) U.S. Cl.
CPC .............. *G06F 8/427* (2013.01); *G06F 8/433* (2013.01); *G06F 8/436* (2013.01); *G06F 8/71* (2013.01)

(58) Field of Classification Search
CPC .......... G06F 8/427; G06F 8/433; G06F 8/436; G06F 8/71; G06F 11/3608
See application file for complete search history.

(56) References Cited

U.S. PATENT DOCUMENTS

| 10,747,641 B2 | 8/2020 | Muske |
| 10,877,749 B1 | 12/2020 | Muske et al. |
| 2022/0027150 A1* | 1/2022 | Hotta ....................... G06F 8/75 |

FOREIGN PATENT DOCUMENTS

| JP | 2004126866 A | * | 4/2004 |
| JP | 2008052424 A | * | 3/2008 |

OTHER PUBLICATIONS

Muske, Tukaram, et al., Survey of Approaches for Handling Static Analysis Alarms, IEEE 16th International Working Conference on Source Code Analysis and Manipulation (SCAM), Oct. 2016, 10 pages, [retrieved on May 6, 2024], Retrieved from the Internet: <URL:http://ieeexplore.ieee.org/>.*

(Continued)

*Primary Examiner* — Geoffrey R St Leger
(74) *Attorney, Agent, or Firm* — FINNEGAN, HENDERSON, FARABOW, GARRETT & DUNNER LLP

(57) ABSTRACT

This disclosure relates generally to method and system for identifying static analysis alarms based on semantics of changed source code. The disclosed technique is integrated in the proprietary static analysis tool that identifies semantics of the change and reports only impacted alarms. The method receives source code and a property over variables to be verified for identifying one or more impacted alarms. Further, an incremental analysis based on the one or more change program points are performed to mark one or more impacted functions in the current version of the source code and then generating a data flow analysis (DFA) and a program dependence graph (PDG) for the one or more impacted functions. Further, a change-based alarm identification technique is utilized for the one or more impacted (Continued)

static analysis alarms from the one or more impacted functions in the current version of source code based on semantics of change.

18 Claims, 7 Drawing Sheets

(56) References Cited

OTHER PUBLICATIONS

Muske, Tukaram, et al., Repositioning of Static Analysis Alarms, ISSTA 2018: Proceedings of the 27th ACM SIGSOFT International Symposium on Software Testing and Analysis, Jul. 2018, 11 pages, [retrieved on May 6, 2024], Retrieved from the Internet: <URL:http://dl.acm.org/>.*
Goknil et al., "A Rule-Based Change Impact Analysis Approach in Software Architecture for Requirements Changes," (2016).
Muske, "Postprocessing of Static Analysis Alarms," (2020).

* cited by examiner

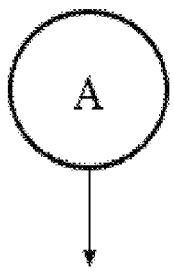

perform by a program analysis module, an incremental analysis based on the one or more change program points to mark one or more impacted functions in the current version of the source code by (i) reanalyzing the one or more change program points, (ii) a change tag, and (iii) the IR mapping between the current version of the source code and the previous version of the source code — 308 identify by an alarm identification module, using a change-based alarm identification technique, the one or more impacted static analysis alarms from the one or more impacted functions in the current version of source code based on semantics of change — 310

FIG.3B

METHOD AND SYSTEM FOR IDENTIFYING STATIC ANALYSIS ALARMS BASED ON SEMANTICS OF CHANGED SOURCE CODE

CROSS-REFERENCE TO RELATED APPLICATIONS AND PRIORITY

This U.S. patent application claims priority under 35 U.S.C § 119 to: Indian patent Application no. 202121048304, filed on Oct. 22, 2021. The entire contents of the aforementioned application are incorporated herein by reference.

TECHNICAL FIELD

The disclosure herein generally relates to identifying static analysis alarms, and, more particularly, to method and system for identifying static analysis alarms based on semantics of changed source code.

BACKGROUND

Static analysis technique for identifying software defects in a source code has been widely used in practice for ensuring software quality and reliability of software through early detection of software defects. The usefulness is due to their scalability, which comes at the cost of precision, because of a trade-off between the two. Conventional static analysis tools are quite useful in detecting runtime programming errors such as division by zero or use of uninitialized variables. These tools, being scalable, are widely used to detect runtime errors in industry strength software. However, the downside is that these tools generate many false alarms which considerably reduces their effectiveness in detecting real bugs and fixing them. This shortcoming becomes more pronounced in analysis of evolving software where false alarms reported in an earlier version are re-reported while analyzing subsequent versions. This leads to a situation in case of evolving software systems, where the old alarms may be reported again and again, in subsequent versions, even if they have nothing to do with what has changed. This makes it an important practical issue as re-reporting of old alarms that adds to the manual inspection effort and is wasteful. To address such problem, static analyzers have been enhanced with techniques like syntactic masking, and several heuristics to decide if an old alarm should be reported again or not.

In one existing method, one may spontaneously turn to incremental analysis to mitigate the said problem, especially as evolving software systems are ideal candidates for such an analysis. Incremental analysis relies on using the previous version of source code for analysis information for the unchanged part of the code, to speed up the analysis of code that has changed or been impacted by the change. Such existing techniques significantly reduce the cost of program analysis, especially for large code bases. Typically, changes between two successive versions hardly amount to one percent of the code size, and thus a complete re-analysis may be wasteful. However, incremental analysis by itself does not automatically resolve the concerns raised with respect to reporting of alarms. For instance, industrial static analysis tools for example Coverity®, Facebook Infer®, Google Tricorder®, and SonarQube® use incremental analysis but while reporting impacted alarms due to a change, they primarily employ techniques such as syntactic masking or use several heuristics to suppress alarms that are likely irrelevant to the code commit. These techniques are unsound, and therefore there is a great risk of missing actual bugs introduced due to the change.

In another existing methods, checking program properties using information obtained from its previous versions has the problem of differential static analysis tools, for example, in differential assertion checking, verification modulo versions, and a SymDiff project. The underlying intent expectedly being to analyze only the code that has changed or has been impacted due to it. However, these approaches do not scale well in practice. the analysis of new code and impacted code as that of analyzing new program paths have been introduced due to the change. This notion of new program paths includes paths that existed earlier but have been modified by the change, along with the ones that did not exist earlier at all. This has been useful in incremental verification/difference verification of assertions, regression model checking, regression test selection. Once the new paths have been identified, techniques such as testing, model checking, and even manual reviewing (for static analysis tool users) may be used to verify if they are indeed buggy or not. For example, differential assertion checking (DAC) constructs a product program for each assert and then gives it to verifier to identify which new paths are failing (the property verification). However, not all new execution paths introduce bugs. Many of the new execution paths may clearly be safe and would not need to be tested, verified or manually reviewed again. Thus, a method to detect the safe new paths will lessen the burden of a testing or a model checking engine, or even a developer, by presenting only likely unsafe paths to them.

SUMMARY

Embodiments of the present disclosure present technological improvements as solutions to one or more of the above-mentioned technical problems recognized by the inventors in conventional systems. For example, in one embodiment, a system for identifying static analysis alarms based on semantics of changed source code is provided. The system performs static analysis over a source code and a property of variables for the source code to be verified for identifying one or more impacted alarms. The difference module preprocesses the source code, to identify one or more change program points between a current version of the source code and a previous version of the source code and generates a line number mapping and a change tag, wherein the line number mapping is the mapping of unchanged line numbers between the current version of the source code and the previous version of the source code. The front-end module generates for the current version of the source code and the previous version of the source code, an intermediate representation (IR), IR mapping, and an edited function wherein an edited function is an enclosed function of changed or added IR objects for the one or more change points mapped to an abstract syntax tree (AST). The program analysis module performs an incremental analysis based on the one or more change program points to mark one or more impacted functions in the current version of the source code by (i) reanalyzing the one or more change program points, (ii) a change tag, and (iii) the IR mapping between the current version of the source code and the previous version of the source code, and then generating a data flow analysis (DFA) and a program dependence graph (PDG) for the one or more impacted functions. The alarm identification module identifies using a change-based alarm identification technique, the one or more impacted static analysis alarms from the one or more impacted functions in the current version of source code based on semantics of change.

The change-based alarm identification technique comprises identifying, a set of reachable program points of interest (POIs) for the one or more change program points using a control flow graph (CFG) traversal. Further, a set of potentially impacted alarms (PIAs) are determined by evaluating the set of reachable program points of interests (POIs) against the property to be verified using an incrementally computed DFA. The one or more impacted alarms are identified for the set of potentially impacted alarms (PIAs) based on at least one of the (i) OR tag, and (ii) AND tag. Further, inside the modified if statement for potentially impacted alarms (PIAs) are checked based on a true branch condition for the OR tag, and a false branch condition for the AND tag. Furthermore, the potentially impacted alarms (PIAs) are evaluated outside modified if statement for identifying the one or more impacted static analysis alarms by performing the steps of, a transitive data dependency is checked for the set of PIAs controlled by the changed condition for OR tag and tag based on a set of predefined criterions, and (ii) a worklist is created for dependencies on the changed node. The one or more alarms are identified as impacted, if the transitive data dependency node is in false branch of the changed condition for the OR tag, and if the transitive data dependency node is in true branch of the changed condition for the AND tag. Further, determining (i) the transitive data dependency of control dependencies on the changed node and, the transitive control dependencies of data dependency on the changed node, and (ii) a worklist is created for dependencies if any of the dependencies is on the changed node, then the set of PIA's are marked as the one or more impacted static analysis alarms.

In another aspect, a method for identifying static analysis alarms based on semantics of changed source code is provided. The method performs static analysis over a source code and a property of variables for the source code to be verified for identifying one or more impacted alarms. The difference module preprocesses the source code, to identify one or more change program points between a current version of the source code and a previous version of the source code and generates a line number mapping and a change tag, wherein the line number mapping is the mapping of unchanged line numbers between the current version of the source code and the previous version of the source code. The front-end module generates for the current version of the source code and the previous version of the source code, an intermediate representation (IR), IR mapping, and an edited function wherein an edited function is an enclosed function of changed or added IR objects for the one or more change points mapped to an abstract syntax tree (AST). The program analysis module performs an incremental analysis based on the one or more change program points to mark one or more impacted functions in the current version of the source code by (i) reanalyzing the one or more change program points, (ii) a change tag, and (iii) the IR mapping between the current version of the source code and the previous version of the source code, and then generating a data flow analysis (DFA) and a program dependence graph (PDG) for the one or more impacted functions. The alarm identification module identifies using a change-based alarm identification technique, the one or more impacted static analysis alarms from the one or more impacted functions in the current version of source code based on semantics of change.

The change-based alarm identification technique comprises identifying, a set of reachable program points of interest (POIs) for the one or more change program points using a control flow graph (CFG) traversal. Further, a set of potentially impacted alarms (PIAs) are determined by evaluating the set of reachable program points of interests (POIs) against the property to be verified using an incrementally computed DFA. The one or more impacted alarms are identified for the set of potentially impacted alarms (PIAs) based on at least one of the (i) OR tag, and (ii) AND tag. Further, inside the modified if statement for potentially impacted alarms (PIAs) are checked based on a true branch condition for the OR tag, and a false branch condition for the AND tag. Furthermore, the potentially impacted alarms (PIAs) are evaluated outside modified if statement for identifying the one or more impacted static analysis alarms by performing the steps of, a transitive data dependency is checked for the set of PIAs controlled by the changed condition for OR tag and tag based on a set of predefined criterions, and (ii) a worklist is created for dependencies on the changed node. The one or more alarms are identified as impacted, if the transitive data dependency node is in false branch of the changed condition for the OR tag, and if the transitive data dependency node is in true branch of the changed condition for the AND tag. Further, determining (i) the transitive data dependency of control dependencies on the changed node and, the transitive control dependencies of data dependency on the changed node, and (ii) a worklist is created for dependencies if any of the dependencies is on the changed node, then the set of PIA's are marked as the one or more impacted static analysis alarms.

In yet another aspect, a non-transitory computer readable medium provides one or more non-transitory machine-readable information storage mediums comprising one or more instructions, which when executed by one or more hardware processors perform actions includes an I/O interface and a memory coupled to the processor is capable of executing programmed instructions stored in the processor in the memory to perform static analysis over a source code and a property of variables for the source code to be verified for identifying one or more impacted alarms. The difference module preprocesses the source code, to identify one or more change program points between a current version of the source code and a previous version of the source code and generates a line number mapping and a change tag, wherein the line number mapping is the mapping of unchanged line numbers between the current version of the source code and the previous version of the source code. The front-end module generates for the current version of the source code and the previous version of the source code, an intermediate representation (IR), IR mapping, and an edited function wherein an edited function is an enclosed function of changed or added IR objects for the one or more change points mapped to an abstract syntax tree (AST). The program analysis module performs an incremental analysis based on the one or more change program points to mark one or more impacted functions in the current version of the source code by (i) reanalyzing the one or more change program points, (ii) a change tag, and (iii) the IR mapping between the current version of the source code and the previous version of the source code, and then generating a data flow analysis (DFA) and a program dependence graph (PDG) for the one or more impacted functions. The alarm identification module identifies using a change-based alarm identification technique, the one or more impacted static analysis alarms from the one or more impacted functions in the current version of source code based on semantics of change.

The change-based alarm identification technique comprises identifying, a set of reachable program points of interest (POIs) for the one or more change program points using a control flow graph (CFG) traversal. Further, a set of potentially impacted alarms (PIAs) are determined by evaluating the set of reachable program points of interests (POIs) against the property to be verified using an incrementally computed DFA. The one or more impacted alarms are identified for the set of potentially impacted alarms (PIAs) based on at least one of the (i) OR tag, and (ii) AND tag. Further, inside the modified if statement for potentially impacted alarms (PIAs) are checked based on a true branch condition for the OR tag, and a false branch condition for the AND tag. Furthermore, the potentially impacted alarms (PIAs) are evaluated outside modified if statement for identifying the one or more impacted static analysis alarms by performing the steps of, a transitive data dependency is checked for the set of PIAs controlled by the changed condition for OR tag and tag based on a set of predefined criterions, and (ii) a worklist is created for dependencies on the changed node. The one or more alarms are identified as impacted, if the transitive data dependency node is in false branch of the changed condition for the OR tag, and if the transitive data dependency node is in true branch of the changed condition for the AND tag. Further, determining (i) the transitive data dependency of control dependencies on the changed node and, the transitive control dependencies of data dependency on the changed node, and (ii) a worklist is created for dependencies if any of the dependencies is on the changed node, then the set of PIA's are marked as the one or more impacted static analysis alarms.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A and FIG. 3B illustrates a flow diagram showing a method for identifying static analysis alarms based on semantics of changed source code using the system of FIG. 1, in accordance with some embodiments of the present disclosure.

DETAILED DESCRIPTION OF EMBODIMENTS

Figure 1:
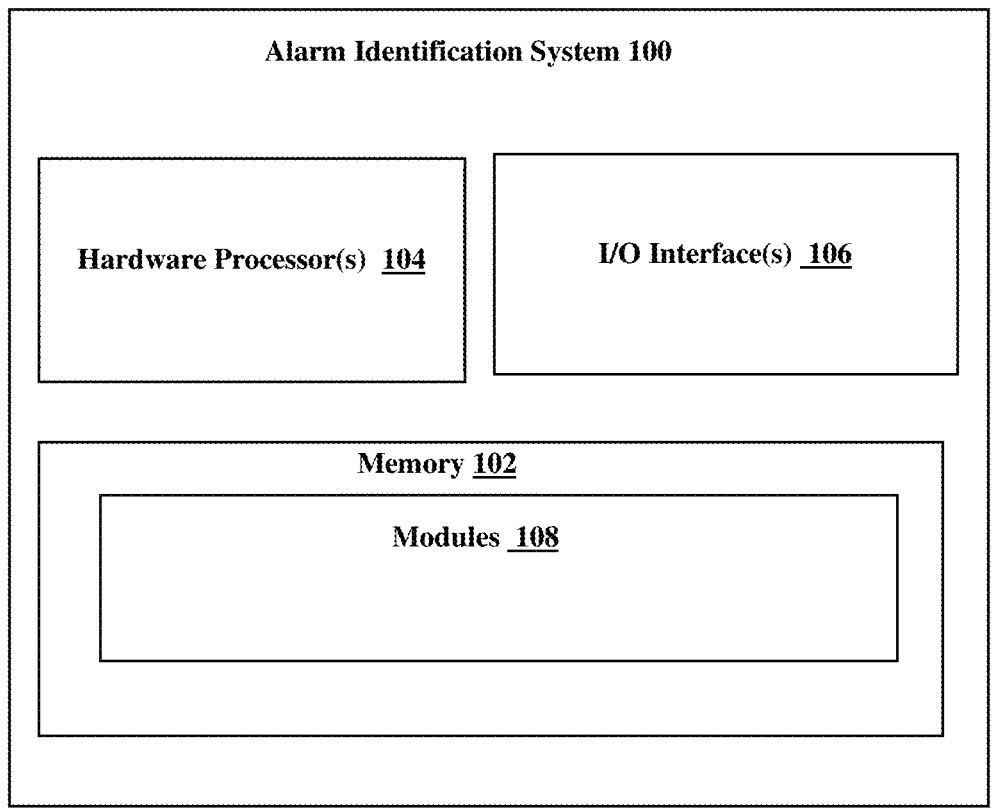
FIG. 1 illustrates a system (alternatively referred as alarm identification system) for identifying static analysis alarms based on semantics of changed source code according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Embodiments herein provide a method and system for identifying static analysis alarms based on semantics of changed source code. The system herein may be alternatively referred as alarm identification system 100. Static analyzers have been enhanced with techniques such as syntactic masking, and several heuristics models to decide if an old alarm should be reported again or not. Such static analyzer techniques lack in considering semantics of change which results in either unsound, or still end up reporting many old alarms. The disclosed alarm identification system 100 is enabled to identify impacted alarms due to change identified in the source code. The change-based alarm identification technique of the system 100 reports one or more alarms only if the alarm point lies on a newly introduced, potentially unsafe, execution path. This technique is integrated into a proprietary static analysis tool which automatically identifies semantics of change from the source code by rapidly performing incremental analysis and reports only the one or more impacted alarms. Further, this technique identifies new execution paths of the changed source code and categorizes them as safe or unsafe based on semantics which helps in detecting presence of such execution paths. This technique incrementally builds required dataflow analysis and program dependence information for the source code which is time efficient and accurate. Additionally, the system 100 is experimentally evaluated on a core banking application with results conducted on 124 versions that demonstrates i) 66% faster than whole program analysis, ii) leads to 83% reduction in repetitive alarms, and iii) reports 62% lesser alarms as compared to syntactic change impact analysis (CIA). The disclosed alarm identification system 100 is further explained with the method as described in conjunction with FIG. 1 to FIG. 6 below.

Referring now to the drawings, and more particularly to FIG. 1 through FIG. 6, where similar reference characters denote corresponding features consistently throughout the figures, there are shown preferred embodiments and these embodiments are described in the context of the following exemplary system and/or method.

FIG. 1 illustrates a system for identifying static analysis alarms based on semantics of changed source code according to some embodiments of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
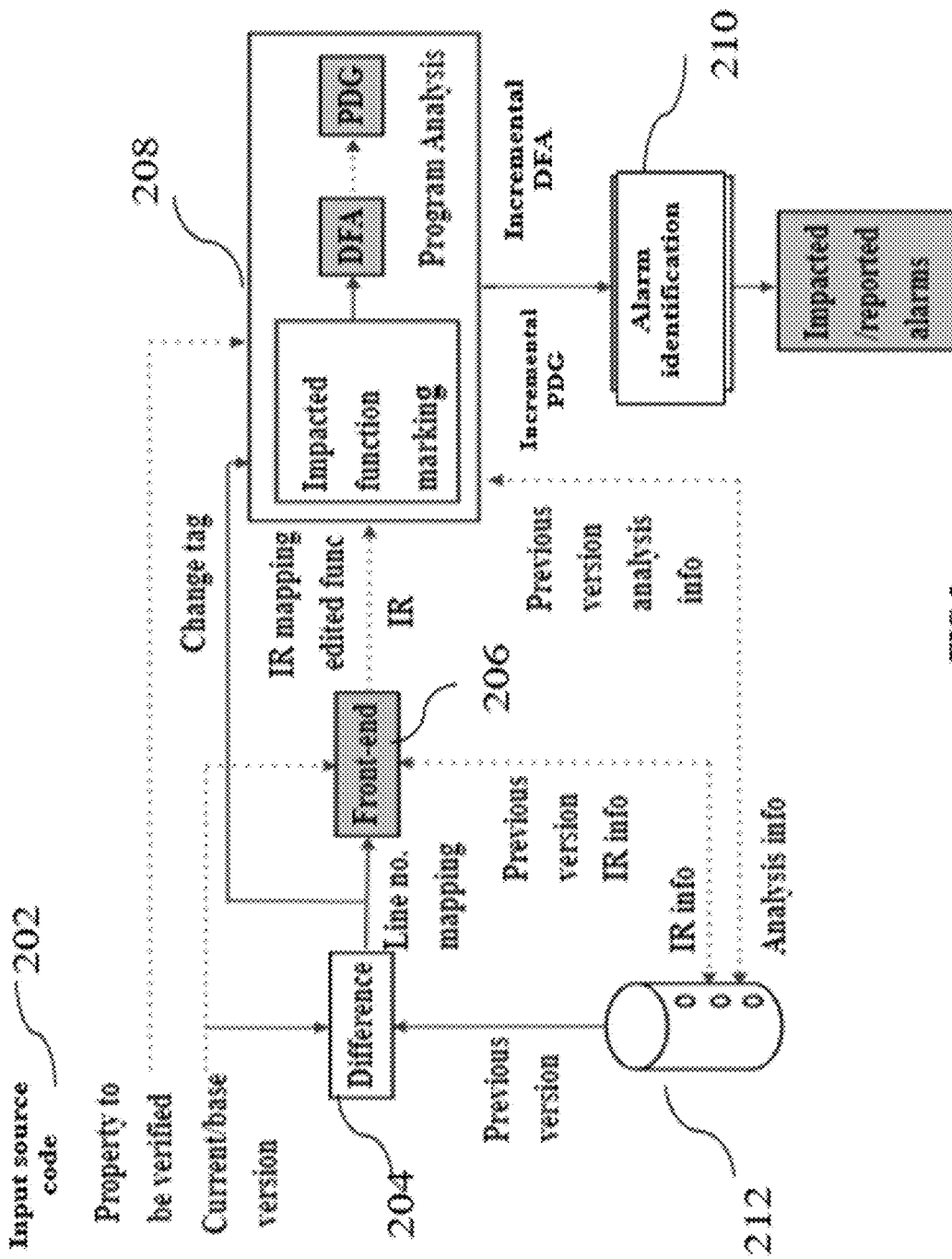
FIG. 2 is a functional high-level architecture of the system for identifying static analysis alarms based on semantics of changed source code using the FIG. 1, according to some embodiments of the present disclosure.

FIG. 2 is a functional high-level architecture of the alarm identification system for identifying static analysis alarms based on semantics of changed source code using the FIG. 1, according to some embodiments of the present disclosure. FIG. 2 shows a proprietary static analysis tool comprising a difference module 204, a front-end module 206, a program analysis module 208, an alarm identification module 210, and a data source 212.

In the preferred embodiment, the static analysis module of the alarm identification system 100 carries out static analysis over an input source code to be analyzed and the property to be verified. The input source code 202 or a program code to the static analysis tool can be a new program referred as a current version of the source code or a previous version of the source code being analyzed. The input source code is referred as the current version of the source code is fed to the system 100 for which whole program analysis (WPA) is performed and the output of the static analysis tool is one or more impacted alarms identified from the whole program or the source code. Further, incremental analysis is performed when the input source code is the current version of the source code, and the output is the one or more alarms from the changed or potentially impacted part of the source code. All the modules and flow lines are executed during incremental analysis.

In the preferred embodiment, the preprocessing stage of the input source code is performed by the difference module 204 and the front-end module 206 of the system 100. The difference module 204 of the system 100 preprocesses the previous version of the source code and the current version of the source code using a known in the art tool to find textual differences between the two versions of the source code. The known in the art tool utilized here is the GNU DiffUtils. The type of change in the modified lines of the current source code is determined by comparing with similar lines mapped with the previous version of the source code using python libraries. Further, the difference module 204 of the system 100 ignores cosmetic changes such as addition/deletion of blank lines, whitespaces and thereof that are inconsequential to the analysis of the current source code.

In the preferred embodiment, the front-end module 206 of the system 100 converts the high-level language source code into its intermediate representation (IR). The IR of the current version of the source code consists of Symbol Table (ST), Abstract Syntax Tree (AST) and Associations (ASS). This representation stores each program entity in the form of objects having attributes such as line number, object type, relations between objects, unique identification integer (UID) and thereof.

The program analysis module 208 of the system 100 obtains input from the preprocessing stage and generates a data flow analysis (DFA) and a program dependency graph (PDG) for the current version of the source code incrementally.

The alarm identification module 210 of the system 100 executes the disclosed change-based alarm identification technique to identify one or more impacted alarms in the current version of the source code.

The data source 212 of the system 100 stores the previous version of the source code and is fetched accordingly as needed in the system 100. Functions of the components of system 100, for identifying the one or more impacted static analysis alarms dataset using the change-based alarm identification technique, are explained in conjunction with FIG. 3A through FIG. 6 providing flow diagram, architectural overviews, experimental results and performance analysis of the system 100.

Figure 3A:
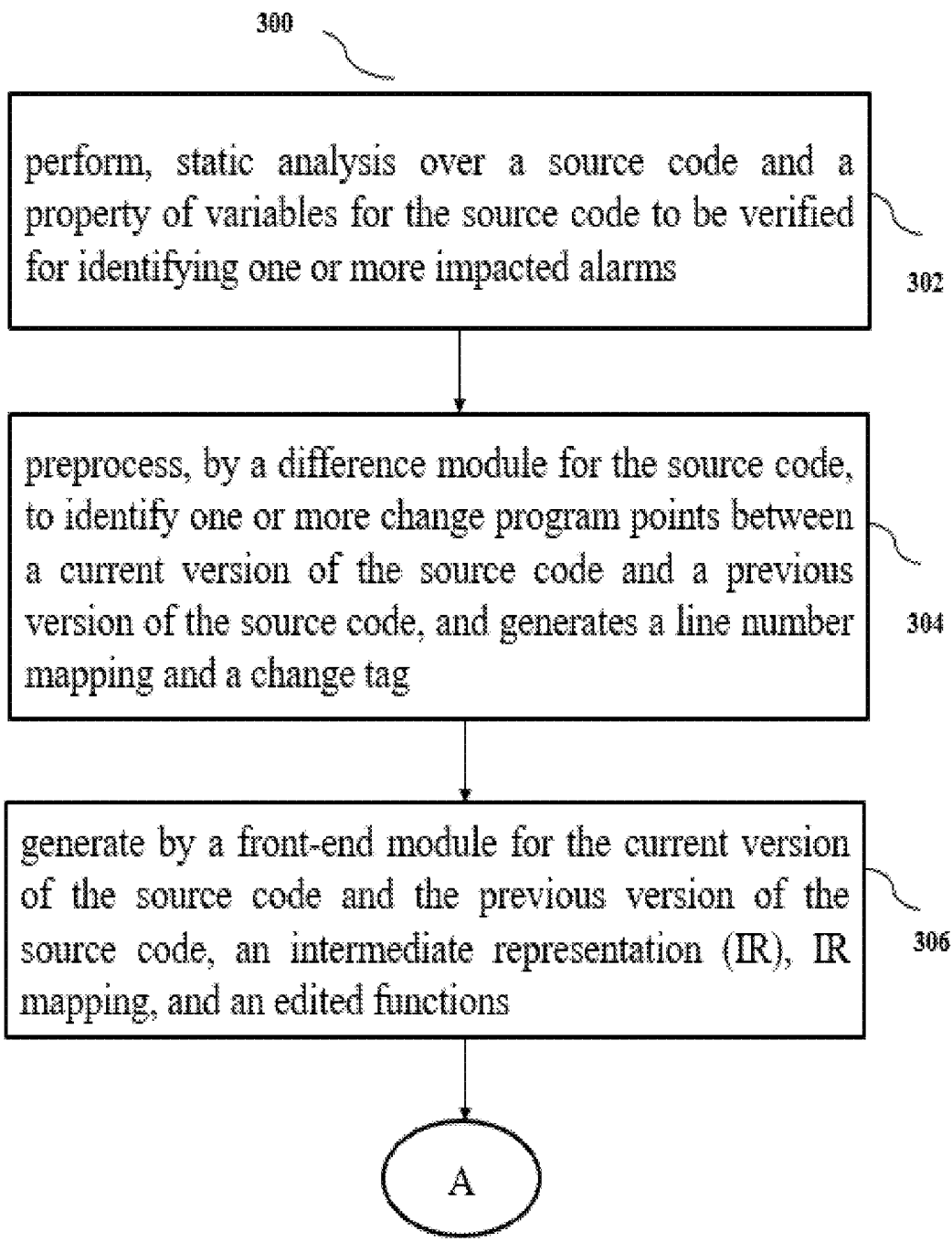

FIG. 3A and FIG. 3B illustrates a flow diagram showing a method for identifying static analysis alarms based on semantics of changed source code using the system of FIG. 1, in accordance with some embodiments of the present disclosure. In an embodiment, the alarm identification system 100 comprises one or more data storage devices or the memory 102 operatively coupled to the processor(s) 104 and is configured to store instructions for execution of steps of the method 300 by the processor(s) or one or more hardware processors 104. The steps of the method 300 of the present disclosure will now be explained with reference to the components or blocks of the alarm identification system 100 as depicted in FIG. 2 through FIG. 6. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring now to the steps of the method 300, at step 302, the one or more hardware processors 104 perform static analysis over a source code and a property of variables for the source code to be verified for identifying one or more impacted alarms. The present disclosure is further explained considering an example as depicted in Table 1, where the system 100 processes the received source code as input along with the property to be verified for identification of new program paths for categorizing as safe path and unsafe path using the change-based alarm identification technique.

The classification of new paths using the example in Table 1 is used for analyzing the use of uninitialized variables.

TABLE 1

Example source code

|   | x = 20;<br>... |   | x = 20;<br>... | | |
|---|---|---|---|---|---|
| 1 | y = 6; | 1 | y = 6; | | |
| 2 | if (x==10) | 2 | if(x==10 | ‖ x==20) | //change |
| 3 | a = y; | 3 | a = y; | //use y | |
| 4 | p = 20; | 4 | p = 20; | | |
| 5 | else | 5 | else | | |
| 6 | m = 5; | 6 | m = 5; | | |
| 7 | b = z; | 7 | b = z; | //use z | |
| 8 | if(p==20) | 8 | if(p==20) | //use p | |
| 9 | q = 3; | 9 | q = 3; | | |
| 10 | print (y); | 10 | print (y); | //use y | |
| 11 | c = q; | 11 | c = q; | //use a | |
| 12 | d = m; | 12 | d = m; | //use m | |
| (a) previous version | | (b) new version | | | |

From the above Table 1, categorization of the paths are as follows, $C_1$—paths along which no new states are reachable because of the change.

$C_2$—paths along which new states, though reachable, do not cause a property violation.

$C_3$—paths along which new states, which may cause a property violation, are reachable and such belonging to $C_1$ and $C_2$ as safe, while those belonging to $C_3$ as unsafe.

Any program point that lies on an unsafe path is impacted by the change. Hence, these program points are reported as the one or more alarms to the static analysis tool user. In the current version of the source code or the input source code on the right side of the branch condition expression at line 2 is modified by adding a disjunct. The program points of interest (POIs)—use points that are potentially impacted by this change are at line 3, 7, 8, 10, 11 and 12. It is first noted that no new path goes through the use point at line 7 in the current version of the source code, and hence can be ignored. Table 2 shows categorization of new execution paths for each of the other lines. Paths are represented using sequence of line numbers, where start point of program is represented by start.

TABLE 2

Categorization of new execution paths

| Use Point at Line | Category | Execution Path in Current Version |
|---|---|---|
| 3 | $C_2$ | start . . . 1-2-3 |
| 8 | $C_2$ | start . . . 1-2-3-4-8 |
| 10 | $C_1$ | start . . . 1-2-3-4-8-9-10 |
| 11 | $C_2$ | start . . . 1-2-3-4-8-9-10-11 |
| 12 | $C_3$ | start . . . 1-2-3-4-8-9-10-11-12 |

It is categorized that these new paths find if any of the use program point is impacted by the one or more change. The use of program point at line 10 is categorized as $C_1$ because the definition of variable y at line 1 was on an old path too. Hence, no new states are reachable along the new path. New paths reaching variables y (at line 3), p (at line 8), and q (at line 11), have definition at line 1, 4, and 9, respectively. These new paths belong to the category $C_2$, as the definitions (being present) ensure that the property cannot be violated. However, new path reaching line 12 do not have a definition of the variable m. This may lead to property violation, and hence it is put in the category $C_3$. Since the paths in $C_1$ and $C_2$ are safe, the use points at line 3, 8, 10 and 11 are not impacted by the change. However, the use point at line 12 lies on an unsafe path and is therefore impacted by the change. It is to be noted that recent techniques report the program points at line 3, 7, 8, 10, 11 and 12 as impacted, for this example.

Referring now to the steps of the method 300, at step 304, the one or more hardware processors 104 preprocess by a difference module for the source code, to identify one or more change program points between a current version of the source code and a previous version of the source code, and generates a line number mapping and a change tag, wherein the line number mapping is the mapping of unchanged line numbers between the current version of the source code and the previous version of the source code. Referring now to the above example and FIG. 2, for the received current version of the source code the difference module 204 generates two outputs such as (i) a line number mapping, and (ii) a change tag. The preprocessing stage of the input source code or the current version of the source code is performed by the difference module 204 and the front-end module 206 of the system 100. The difference module 204 takes as input the current version of the source code and the previous version of the source code obtained from the data source 212 to find the textual differences between the two versions of the source code. The first output of the difference module 204 is the line number mapping and is performed for the current version of the source code where the mapping of unchanged line number is between the current version of the source code and the previous version of the source code. The second output of the difference module 204 is the change tag which is based on the type of change observed on the current version of the source code. The list of change tag includes an OR tag, a AND tag, an IF-OTHER tag, and a NIF-OTHER tag. Here, the semantics of change is the one or more change program points captured as semantics in the form of change tags. The four change tags such as the OR tag, the AND tag, the IF-OTHER tag, and the NIF-OTHER tag. When the condition expression C of an if statement changes to C', such that, C→C', change tag is OR tag. Similarly, when change is such that C'→C, then the change tag is AND tag. When the effect of change cannot be determined as the OR tag or the AND tag then the change tag is IF-OTHER tag. For changes other than modified if condition expression (for example, change in assignment), the change tag is NIF-OTHER tag.

Referring now to the steps of the method 300, at step 306, the one or more hardware processors 104 generate by using a front-end module for the current version of the source code and the previous version of the source code, an intermediate representation (IR), IR mapping, and an edited functions, wherein each function is an enclosed function of changed or added IR objects for the one or more change points mapped to an abstract syntax tree (AST). Referring now to the above said example, the front-end module 206 in the preprocessing stage generates the intermediate representation for the difference identified in the current version of the source code and the previous version of the source code based on incremental analysis mapped to the AST. The IR mapping is a mapping of mapped lines that are one-to-one unique identification integer (UID) between the IR objects of the previous version of the source code and the current version of the source code. For the unmapped lines IR mapping are IR objects marked as changed. The edited function is an enclosed function of changed IR objects for the one or more change program points mapped to an abstract syntax tree (AST).

Referring now to the steps of the method 300, at step 308, the one or more hardware processors 104 performs an incremental analysis based on the one or more change program points to mark one or more impacted functions in the current version of the source code by (i) reanalyzing the one or more change program points, (ii) a change tag, and (iii) the IR mapping between the current version of the source code and the previous version of the source code, and then generating a data flow analysis (DFA) and a program dependence graph (PDG) for the one or more impacted functions. Referring now to FIG. 2 and for the above said example, the program analysis module 208 fetches the output of the preprocessing stage from the difference module 204 and the front-end module 206 and generates the DFA and the PDG based on incremental analysis on the one or more change program points. This program analysis module 208 includes submodules such as the impacted function marking, the DFA, and the PDG. The data flow analysis for the current version of the source code is performed by the underlying analysis for the static analysis tool is function-summary based inter-procedural DFA. It is performed in two phases. In the first phase, the call graph is traversed in bottom-up order for constructing function summary which is used to incorporate the effect of calls to the function. In the second phase, the call graph is traversed in top-down order and uses function summaries to represent the effect of the calls at the call sites. The generated data-flow analysis information is later used at each program points of interest (POIs) to determine if the input property (such as division by zero, use of uninitialized variables) holds or not.

The program dependence graph is constructed for the intra-procedural PDG for each function, using the known in the art techniques (G. Bilardi and K. Pingali. A framework for generalized control dependence, In Proceedings of the ACM SIGPLAN 1996 conference on Programming language design and implementation, pages 291-300, 1996.) to construct the control dependence graph. The PDGs are then linked, and inter-procedurally valid data and control dependences are computed. The static analysis tool stores the DFA which is the function summaries as well as the PDG in the disk so that it can be cached while incrementally analyzing subsequent version of this program. Further, a function level analysis is computed, stored, and cached at function level.

In an embodiment, the incremental analysis comprises recalculating the data flow analysis (DFA) and the program dependence graph (PDG) for the one or more impacted functions marked in the current version of the source code by (i) reanalyzing the one or more change points, (ii) the change tag, and (iii) the IR between the current version of the source code and the previous version of the source code. Here, the call points are traversed on the control flow graph inter-procedurally starting from the one or more changed program points. The called functions from these reachable call points are marked as the one or more impacted functions. Also, functions in upward call hierarchy of edited function are added to the impacted functions as depicted in Table 3, which shows the current version of the analyzed source code has program points with function $f_3$ as edited function.

TABLE 3

Marking of impacted functions

```
f₁ () {              f₂ () {              f₃ () {
 ...                  ...                   f₆ ();
  f₂ ();              ...                   ...
  ...                  f₅ ();              // change
  If (*) {            ...                   ...
    f₃ ();            f₆ ();                f₇ ();
    f₄ ();           }                      ...
  else                                     }
    f₈ ();
  ...
}
```

Calls to functions in $f_7$ and $f_4$ are reachable from change. Function $f_1$ is caller of edited function $f_3$. Hence, the one or more impacted functions are $f_7$, $f_3$, $f_4$, and $f_1$. Further for incremental DFA for the current version of the source code, in the first phase of DFA i.e., bottom-up analysis, and function summaries are calculated only for the impacted functions $f_7$, $f_3$, $f_4$, and $f_1$. The second phase of DFA i.e., top-down analysis uses freshly computed function summaries when the call is to impacted function or previous version's stored summaries when the call is to non-impacted function. Using IR mapping, unique identifications (UIDs) in previously stored summaries are mapped to UIDs for newly computed summaries. The updated function summaries are stored for future caching. Moreover, the recomputed summary of each impacted function for the current version of the source code is compared with the previous summary and if the summary for a function does not change, then the summary of its dependencies will also remain same. Hence, summaries are computed when a function with no change in summary is encountered. Further, for Incremental DFA, the static analysis tool uses change tags generated by the difference module 204 and the property to be verified to initiate the incremental DFA. For example, to check the uninitialized variables property, DFA information (defined variables information) does not change when the change tag is the OR tag or the AND tag or the IF-OTHER tag. For incremental PDG, the PDG for edited function is re-computed. The PDG from the previous version of the source code is cached and the inter-procedural links with caller and callee function are updated to get the updated PDG. This updated PDG is stored for future caching.

Referring now to the steps of the method 300, at step 310, the one or more hardware processors 104 identifies by using an alarm identification module using a change-based alarm identification technique, the one or more impacted static analysis alarms from the one or more impacted functions in the current version of source code based on semantics of change. Here, the one or more impacted functions from the said example is analyzed using the change-based alarm identification technique where the one or more non-impacted alarms are identified, and the remaining reported impacted alarms are ignored. Along with incrementally computed CFG, DFA, and PDG, uses semantics of change. The change-based alarm identification technique is explained in further sections of the proposed disclosure using the Lemmas defined in the subsequent section.

In another embodiment, for identifying the one or more impacted alarms statically as per the definition given, it is intractable as any execution trace enumeration-based algorithm is known to be so. To make it tractable, abstract are used for static program representations such as the control flow paths, and the data and control dependence. For control flow paths, the control flow graph (CFG) is used, and for data and control dependence, the use of program dependence graph (PDG) representations of programs. There is a one-to-one correspondence between the nodes of the CFG and the PDG, which represents assignments or condition in the current version of the source code. While in the CFG, an edge indicates that control may flow from source statement to target statement in some execution of the program, in PDG there are two kinds of edges,
  (1) Data dependence edge indicates that source node is data dependent on target node.
  (2) Control dependence edge indicates that source node is control dependent on target node.
  Definition 1. (Reachability dependence) Reachability (from start of the source code) of a statement $S_1$ is said to be dependent on statement $S_2$, if there is a path in PDG from node $S_1$ to $S_2$ starting with a control dependence edge.
  Definition 2. (Value dependence) Value of an expression at a statement $S_1$ is said to be dependent on statement $S_2$, if there is a path in PDG from node $S_1$ to $S_2$ starting with a data dependence edge.
Using the abstractions of the CFG and the PDG, a set of predefined criterions are determined under which the POI cannot be an impacted alarm. Hence, with such definition change-based alarm identification technique identifies the one or more impacted alarms and the remaining alarms are reported as non-impacted alarms.

In one embodiment, notion to report each impacted alarm after each change has been made in the current version of the source code. It is formalized using the concept of execution traces and their correspondence in previous version of the source code and each changed program point, and by defining the criteria's mentioned below. Such predefined criteria identify when an execution trace in changed program point becomes unsafe while corresponding execution trace in previous version of the source code found to be safe with respect to the alarm point, the execution trace and execution path interchangeably referred.
Criteria's:
  1. Representing Change—The previous version of the source code is denoted as p and the current version of the source code is denoted as p'. It is assumed that location of program points are numbered as 0,1, 2,n and the two versions of the source code are represented in a normalized form, where
    a) Each location in p' has corresponding location in p and vice-versa.
    b) Each variable of p' exists in p too and vice-versa.
The assumption of previous version of the source code and the current version of the source code being in normalized form does not pose any limitation, as the same can be obtained by taking the changes from the previous and the current version as a series of atomic changes, which is deletion/insertion of a statement (modification to a statement is deletion followed by insertion). For deletion, the deleted statement is replaced by skip statement, and for insertion, a skip statement in the previous version of the source code at that location. Further, the semantics remain unchanged and so is the location mapping. Variables themselves are never deleted and any introduction of new variable is done in previous version of the source code. To simplify, it is assumed that there is a single change made in the program and there is one location where a property is being checked. Let the location where the property $\phi$ is being checked be $l_\phi$, and the location where the change (insertion/deletion) has been introduced be $l_c$.

2. Execution trace—An execution trace is defined as a sequence of pair of location and state at that location. We denote a program state by a map $\sigma$: Var$\rightarrow$Val where Var is the set of variables in program and Val is domain of values which variables can be assigned to. The initial state from which a program starts execution, decides the execution trace of a run of the program.
Let $\Sigma_0$ be set of all initial states of programs p and p'. For a given initial state, say $\sigma_0$, let $\tau_{\sigma 0}$ and $\tau'_{\sigma 0}$ be the traces of p and p', respectively. These traces $\tau_{\sigma 0}$ and $\tau'_{\sigma 0}$ correspond to each other.
  3. Unsafe trace—It is said that trace $\tau'_{\sigma 0}$ of p' is unsafe when following are satisfied, when
    a) $\tau'_{\sigma 0}$ contains a pair $(l_\phi, \sigma')$ such that $\phi$ evaluates to false in state $\sigma'$.
    b) In the corresponding trace $\tau_{\sigma 0}$ in the previous version of the source code, for all pairs $(l_\phi, \sigma)$, belonging to the trace, $\phi$ evaluates to true in state $\sigma$.
Referring now to FIG. 2 through FIG. 3B, to detail Lemma 1 where "an unsafe trace must pass through the location of change $l_c$".
Proof: Suppose $\tau'_{\sigma 0}$ is an unsafe trace and does not pass through $l_c$. Then the corresponding trace $\tau_{\sigma 0}$ does not pass through $l_c$ and both the traces must be identical. In that case since $\tau'_{\sigma 0}$ is unsafe, it must contain a pair $(l_\phi, \sigma')$ such that $\phi$ is false in state $\sigma'$. But then the same pair comprised in the corresponding trace $\tau_{\sigma 0}$ which violates the criteria for $\tau'_{\sigma 0}$ to be unsafe.
Impacted alarm—It is said that alarm point at $l_\phi$ is impacted if there exists an initial state $\sigma_0$ such that the trace $\tau'_{\sigma 0}$ in p' is unsafe.
Theorem 1—If the alarm point at $l_\phi$ is not impacted then it need not be reported in changed program.
Proof—If the alarm point is not impacted, it means there is no unsafe execution trace which means all the execution traces in new programs are of following kinds,
  a) The trace does not pass through the alarm point.
  b) At all the occurrences of location $l_\phi$ in the trace, the property is true in corresponding state.
  c) In the corresponding trace in the previous version of the source code, there is at least one occurrence of location $l_\phi$ where the property is false in corresponding state.
In case (a) and (b), each alarm point is no longer alarm point. In case (c), it was indeed an alarm point and must have been reviewed in the previous version of the source code and so need not be reviewed again. Therefore, if the alarm point is not impacted it is not required for review and hence need not be reported.
Lemma 2—If the POI is not reachable from each change point in the CFG of program then the POI cannot be an impacted alarm.
Proof—It is observed that if the POI is not reachable from the change point, then the corresponding execution paths going through the POI in new and old programs will be exactly same. Hence, it cannot be the case that property evaluates to false for some execution path in new program and it evaluates to true for the corresponding execution path in the old program. Hence as per the definition, there can be no unsafe path going through POI. Therefore, the POI cannot be an impacted alarm.
Lemma 3—If the property at POI in new program is proved to evaluate to true always then POI cannot be an impacted alarm.
Proof. If the property at POI in new program is known to evaluate to true always then there can be no execution path going through POI along which the property evaluates to false, branch condition. And therefore, there can be no unsafe execution paths as per the definition. Hence, such POIs cannot be an impacted alarm. Based upon modelling of the changes made in the source code, it is to be noted that there are primarily two kinds of changes,
1) Change of a condition expression
2) Change of an assignment
3) Change in a condition Suppose the condition C in original program is changed to C' in new program. Typically, such changes in practice are of the form where the AND tag/the OR tag clause is added/deleted to/from the old condition. Only in few cases the change can be quite arbitrary.

Lemma 4—If C→C' then no PoI that is reachable only when C' is false can be an impacted alarm.

Proof. It is obvious that if a POI is reachable only when C' is false in changed program then it would be reachable only when C is false in original program. In addition, condition C in original program will be false in a state space under which C' is false in the changed program. Consequently, since change is in a condition, the execution traces reaching to POI in changed program passing through changed condition will be same as corresponding traces in the original program. And therefore, as per the definition of impacted alarms, the POI cannot be impacted alarm.

Lemma 5—If C'→C then no POI that is reachable only when C' is true can be an impacted alarm.

Proof. Proof is left for brevity as it is on similar lines as that of Lemma 4.

Lemma 6—If a POI is reachable from true as well as false branches of the changed condition then the POI cannot be impacted alarm provided with allowing set of predefined criterions includes, first criterion—Reachability of POI is not dependent on any assignment whose reachability is dependent on changed condition.

second criterion—Value of property at POI is not dependent on any assignment whose reachability is dependent on changed condition.

Proof—The first criterion will ensure that if an execution path is reaching at POI in changed program, then so will the corresponding execution trace in original program and number of occurrences of POI in the two traces will be same. The second criterion will ensure that value of property at some occurrence of POI in an execution trace in changed program will be same as that at the corresponding occurrence of POI in the corresponding execution trace in original program. These two facts put together with the definition of impacted alarm, the POI cannot be an impacted alarm.

Lemma 7—A POI cannot be impacted alarm if both of the following rules hold:

first rule—Reachability of POI in the previous version of the source code program is not dependent on the deleted(inserted) assignment.

second rule—Value of property at POI in the version of the source code program is not dependent on the deleted(inserted) assignment.

Proof—The proof is similar to Lemma 6 with conditions (1) and (2) corresponding to conditions (1) and (2) of Lemma 6.

The change-based alarm identification technique identifies the one or more impacted functions in the current source code based on semantics of change as described below in Table 4, from the said example takes the one or more changed program point as input and returns the one or more impacted alarms. The disclosed technique utilizes the PDG functionalities—procedures of getCD and getDD are implementation of PDG to get direct Control Dependence (CD) and Data Dependence (DD), respectively. Procedures of getTransCD and getTransDD gives transitive CDs and DDs, respectively. Procedure of getPDGNode returns corresponding PDG node for the given program points.

TABLE 4

Change-based alarm identification technique

```
Input: changepoint
Output: impactedAlarmsSet = getreachable
reachablePoISet = getReachablePoI (change Point, CFG)
PIAlarmsSet = evauateProperty (reachablePoISet, DFA)
Procedure getimpactedAlarms (PIAlarmSet)
    if isModifiedIFCond then
        trueBranchAlarmSet = ∀ α ∈ PIAlarmsSet | a in true branch of
changedNode
        falseBranchAlarmSet = ∀ α ∈ PIAlarmsSet | a in true branch of
changedNode
    if changeTag == OR then
            impactedAlarmsSet +=trueBranchAlarmsSet
    else
            if changeTag ==AND then
                impactedAlarmsSet +=falseBranchAlarmsSet
    PIAlarmsSet = PIAlarmsSet − (falseBranchAlarmsSet +
trueBranchAlarmsSet)
    checkDepOnChnageForANDOR (PIAlarmsSet)
else
    impactedAlarmsSet += ∀ α ∈ PIAlarmsSet | isDepOnChnageForOTHER
(a)
is true
procedure checkDepOnChangeForANDOR (PIAlarmsSet)
    for PIAlarm ∈ PIAlarmsSet do
        if isDDOnChange (PIAlarm) then
            impactedAlarmsSet +=PIAlarm
        else isTransCDorDDOnChange (PIAlarm)
            impactedAlarmsSet +=PIAlarm
procedure isDDOnChange (PIAlarm)
    node = getPDGNode (PIAlarm)
    ddSet = getTransDD(node)
    for ddNode ∈ ddSet do
        wklist ← getCD(ddNode)
    while wklist ≠ φ do
        cdNode ← pop(wklist)
        if cdNode == changedNode then
            branch = getbranch (ddNode, changedNode)
            if changeTag ==OR then
                if branch == false then return true
                else markVisitedDDNodeSafe(ddNode)
            else
                if changeTag ==And then
                    if branch == true then return true
                    else markVisitedDDNodeSafe(ddNode)
        else
            wklist ← getCD(cdNode)
return false
procedure isTransCDorDDOnChange (PIAlarm)
    if isTransCDorDDOnChange (PIAlarm) then return true
    else isTransCDorDDOnChange (PIAlarm) return true
procedure isTransCDOfCDOnChange (PIAlarm)
    node = getPDGNode (PAlarm)
    wklist ← getCD(node)
return isDepOnChange(wklist)
procedure isTransCDOfCDOnChange (PIAlarm)
    node = getPDGNode (PAlarm)
    ddSet = getDD(node)
    for ddNode ∈ ddSet do
        if ¬ isVisitedSafeDDNode(ddNode) then
            wklist ← getCD(node)
    return isDepOnChange(wklist)
procedure isDepOnChangeForOTHER (PIAlarm)
    node = getPDGNode (PAlarm)
    wklist ← getDD(node)
    wklist ← getCD(node)
return isDepOnChange(wklist)
procedure isDepOnChange(wklist)
    while wklist ≠ φ do
        node ← pop(wklist)
        if node ==changedNode then return true
```

TABLE 4-continued

Change-based alarm identification technique

```
    wklist ← getCD(node)
    wklist ← getDD(node)
return false
```

The change-based alarm identification technique performs the following steps,

Step 1 of the change-based alarm identification technique identifies a set of reachable program points of interest (POIs) for the one or more change program points using a control flow graph (CFG) traversal. From the procedure getReachablePoI function identifies POIs that are reachable from the one or more change program points using the CFG traversal (Lemma 2).

Step 2 of the change-based alarm identification technique—determines, a set of potentially impacted alarms (PIAs) by evaluating the set of reachable program points of interests (POIs) against the property to be verified using an incrementally computed DFA. Next, the reachable POIs are evaluated against the given property using incrementally computed DFA information in procedure evaluateProperty. POIs evaluated to be true are ignored (Lemma 3) and remaining POIs are the potentially impacted alarms (PIA) are passed for further evaluation.

Step 3 of the change-based alarm identification technique identifies the one or more impacted alarms for the set of potentially impacted alarms (PIAs) based on at least one of the (i) OR tag, and (ii) AND tag. Here, the Procedure getImpactedAlarms processes the PIAs based on the change tag. If the change tag is OR tag or the AND tag, then variable isModifiedIFCond is set to true. Based on the value of change tag, the one or more impacted alarms set is updated as per Lemma 4 and Lemma 5.

Step 4 of the change-based alarm identification technique checks inside the modified if statement for potentially impacted alarms (PIAs) based on a true branch condition for the OR tag, and a false branch condition for the AND tag. Here, the reachable PIAs from both true and false branch are evaluated by the procedure checkDepOnChangeForANDOR. Procedure isDDOnChange checks for a second criterion from the set of predefined criterions of Lemma 6 and procedure isTransCDorDDOnChange checks for a first criterion from the set of predefined criterions. PIA is added to each impacted alarm set if any one of the criteria fails. Procedure isDDOnChange checks for the scenario where the DD of PIA appears in either true or false branch of modified if statement. It mainly checks that this direct or transitive DD of PIA is controlled by changedNode (PDG node associated with changed program point) or not. The alarm is impacted if ddNode is in false branch of the changedNode when the change tag is OR if ddNode is in true branch of the changedNode when change tag is AND tag.

Step 5 of the change-based alarm identification technique evaluates the potentially impacted alarms (PIAs) outside modified if statement for identifying the one or more impacted static analysis alarms by,
 1. checking a transitive data dependency for the set of PIAs controlled by the changed condition for OR tag and tag based on a set of predefined criterions, and (ii) a worklist is created for dependencies on the changed node. The one or more alarms are identified as impacted, if the transitive data dependency node is in false branch of the changed condition for the OR tag, and if the transitive data dependency node is in true branch of the changed condition for the AND tag.
 2. determining, (i) the transitive data dependency of control dependencies on the changed node and, the transitive control dependencies of data dependency on the changed node, and (ii) a worklist is created for dependencies if any of the dependencies is on the changed node, then the set of PIA's are marked as the one or more impacted static analysis alarms.

Procedure isTransDDOfCDOnChange and procedure isTransCDOf DDOnChange to create worklists for control dependence (CDs of direct/transitive DDs of PIA and direct/transitive CDs of PIA) and if any of these CD is same as changedNode, then PIA is marked as impacted. Procedure isDepOnChangeForOTHER is executed when the change tag is NIF-OTHER (Lemma 7), the procedure checks for the first rule and the second rule of Lemma 7 implementing syntactic CIA; by transitively checking data or/and control dependence from PIA node to changedNode. Referring now the example shown in Table 1, procedure getReachablePoI returns PoIs at line 3, 7, 8, 10, 11, and 12. For uninitialized variables property, procedure evaluateProperty evaluates POIs at line 3 and 10 as true since definition of used variable y is reaching at these use points. Rest of the POIs at line 7, 8, 11 and 12 are returned as PIAs. In this example, the change tag is OR tag, hence PIA at line 7 is not added to impactedAlarmSet by procedure getImpactedAlarms. PIA at line 8, is found as non-impacted by procedure checkDepOnChangeForANDOR. However, PIAs at line 11 and 12 are marked as impacted by isTransCDOfDDOnChange and isDDOnChange, respectively. Note that, considering execution paths, PIA at line 11 is not impacted as the used variable q is defined under the condition at line 8 which would evaluate to true. However, in general, using static analysis, accurate evaluation of condition is non-trivial, hence, by taking conservative approach, our algorithm reports such PIA as impacted alarm.

Figure 4:
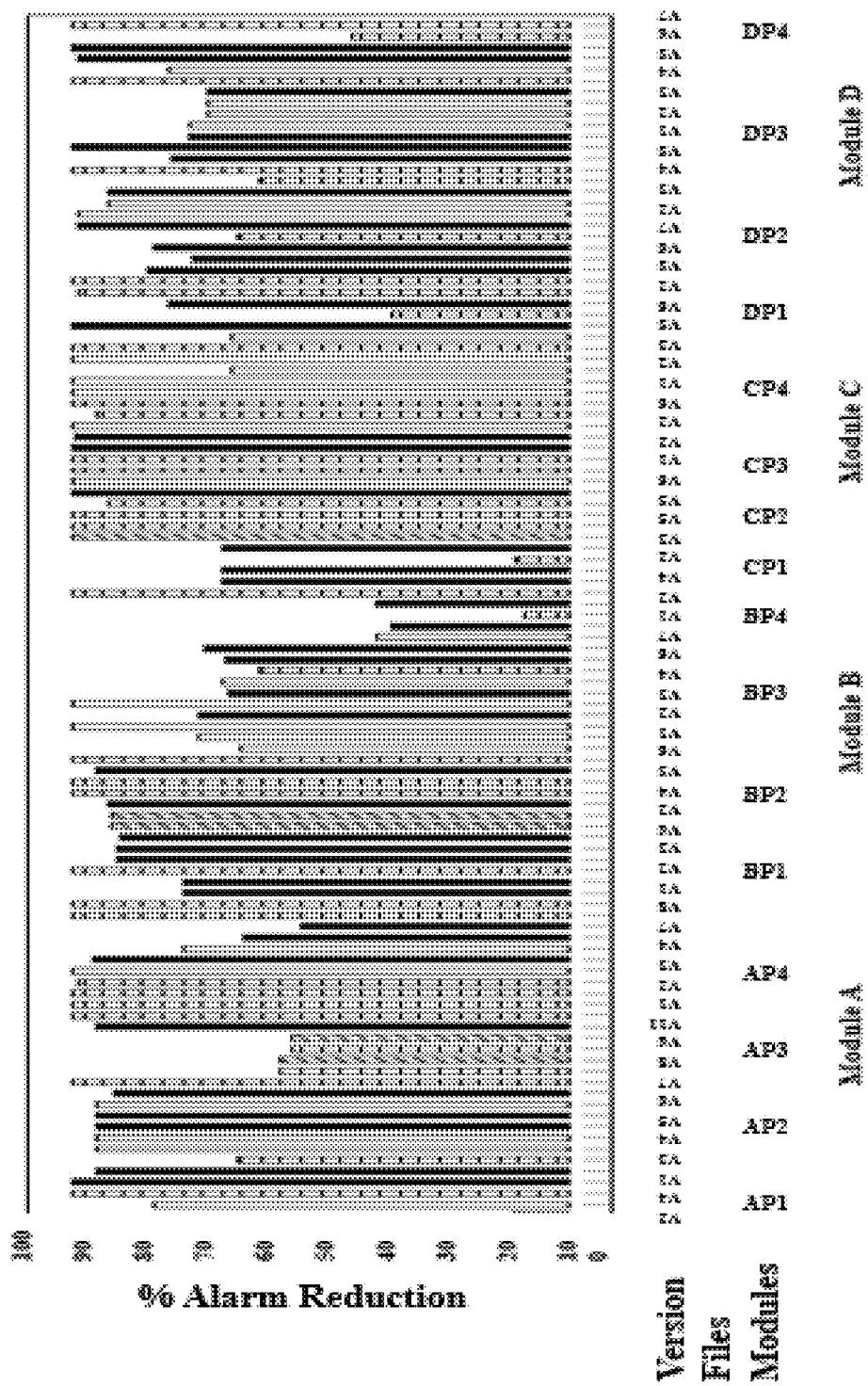
FIG. 4 is a representative example showing experimental results of the source code with reduction of alarms for the change tags using the system of FIG. 1 according to some embodiments of the present disclosure.

FIG. 4 is a representative example showing experimental results of the source code with reduction of alarms for the change tags using the system of FIG. 1 according to some embodiments of the present disclosure. FIG. 4 shows experimental results of the example source code for two case studies over 124 versions of 16 source files taken from four different modules of core banking system (CBS). It is described that this application and the kind of changes made, in the experimental set-up and the results to be discussed in the later section of the embodiments. It is noteworthy that although an obvious measure for effectiveness of the technique would be the number of genuinely impacted alarms found, there is no easy or automated ways of finding this. One needs to rely on a tedious manual review of each reported alarm. Therefore, defined effectiveness of the technique by measuring the reduction in repetitive alarms. The alarms marked as nonimpacted by the technique are repetitive alarms from the previous version of the source code and need not be reported. However, the alarms marked as impacted may not be genuinely impacted (the analysis being conservative), and thus the results may include repetitive alarms.

In one embodiment for the core banking application (CBS) written in COBOL, and has more than 15 modules such as customer information files, loans, deposits, general ledger, payments, trade finance, etc. Each module has around 50 files with an entry point program known as mainline program. Other programs within the modules are called from the mainline. Generally, the size of mainline program is the largest in a module. The functions in a file are closely connected, which makes the study results more insightful. The 124 versions of 16 files from 4 frequently changed modules, with the file sizes ranging from 9KLoC to 87KLoC. Table 5 shows the size of each file, along with the number of functions in them, and the number of different versions of them that were used in the experiments.

TABLE 5

Details of CBS modules and Files

| Module | File Name | KLoC | #Functions | #Versions |
|---|---|---|---|---|
| A | AP1 | 27 | 223 | 5 |
|  | AP2 | 31 | 266 | 9 |
|  | AP3 | 29 | 261 | 12 |
|  | AP4 | 19 | 177 | 10 |
| B | BP1 | 25 | 223 | 8 |
|  | BP2 | 30 | 208 | 7 |
|  | BP3 | 39 | 238 | 8 |
|  | BP4 | 87 | 881 | 5 |
| C | CP1 | 70 | 620 | 6 |
|  | CP2 | 36 | 398 | 9 |
|  | CP3 | 24 | 278 | 7 |
|  | CP4 | 41 | 443 | 7 |
| D | DP1 | 20 | 106 | 8 |
|  | DP2 | 11 | 81 | 8 |
|  | DP3 | 9 | 73 | 8 |
|  | DP4 | 12 | 85 | 7 |

Each file had a base version (the one with the earliest timestamp), and every subsequent version of any file had only one change with respect to its previous version.

B. Type of Change—Table 6 shows the change tags (as explained in Table 5) for each of 108 versions with changes (excluding the 16 base versions). The change tags categorized as IF and OTHER (changes other than IF statement). IF tag comprises of the change tags such as the OR tag, AND tag and IF-OTHER tag. The category IF accounts for about two-thirds of the changes, i.e., 71 of 108 versions. In the remaining 37 versions, the change tag is NIF-OTHER. The changes in the IF tag further split as tags OR, AND, and IF-OTHER, accounting for 38%, 23%, and 4.6% of the changes, respectively. Thus, the OR tag and tag changes were the most common among all the changes that we looked at.

TABLE 6

Number of versions under each tag

| Module Name | IF | | | OTHER |
|---|---|---|---|---|
|  | OR | AND | IF-OTHER | NIF-OTHER |
| A | 11 | 6 | 2 | 13 |
| B | 11 | 6 | 2 | 5 |
| C | 7 | 7 | 1 | 10 |
| D | 12 | 6 | 0 | 9 |

C. Tool Settings—It is further analyzed for the use of uninitialized variable detection by running the static analysis tool in three different settings, namely:
  i) Whole program analysis and alarm reporting (WPA+AR)—where the tool analyses the whole program and the alarms reported are also from the whole program.
  ii) Incremental analysis and semantic change-based alarm reporting (IA+semCBAR)—where the analysis is done incrementally, and the alarms are reported from changed or impacted parts of the code by applying the technique.
  iii) Incremental analysis and syntactic change impact alarm reporting (IA+CIAR)—where the analysis is incremental, and the alarms are reported by applying syntactic CIA. It is to be noted that the experiments were conducted on a Windows 10 machine with an Intel Xeon processor running at 2.5 GHz and 128 GB of RAM.

In the preferred embodiment, results and observations were described for Case study 1—comparison with WPA: For this study, the static analysis tool were executed in 2 settings such as WPA+AR and IA+semCBAR—for each of 124 versions. Then, the alarms were compared and reported with the time taken for analysis in the two settings for 108 versions with changes. It is to be noted that the Change-based alarm reporting effectively reduces repetitive alarms in comparison with WPA. Assume for a version v, $A_{wpa\_ar}$ is the number of alarms reported by WPA+AR setting and $A_{wia\_semcbar}$ is the number of alarms reported by IA+semCBAR settings. It is defined that % of alarm reduced—denoted by $\Delta$—as below in equation 1, $$\Delta = \left( \frac{(A_{wpa\_ar} - A_{wia_{semcbar}})}{A_{wpa_{ar}}} \right) * 100 \qquad \text{equation 1}$$

FIG. 4 shows the 108 versions. On an average, 83.31% of repetitive alarms were reduced using IA+semCBAR, with maximum alarm reduced by 100% and minimum by 9%. In FIG. 4, the change tag for a version OR, AND, IFOTHER, and NIF-OTHER are indicated using patterns respectively. The following observations were made based on the change tags, i) OR tag/AND tag: There are 66 versions with change tag as OR tag/AND tag. As shown in FIG. 4, 100% of alarms are reduced for 12/66 versions, 70-99% of alarm are reduced for 40/66 versions, 40-69% alarms are reduced for 11/66 versions and less than 40% of alarms are reduced for 3/66 versions. Then, 20 alarms were picked randomly, and in a manual inspection observed that 12 out of the 20 alarms are genuinely impacted by the change. For the other 8 alarms, we observed a scenario similar to one in the example (Table 1) for use point of variable q at line 11 where the reaching definition is controlled by a condition that cannot be statically evaluated. Since the technique uses this semantics to mark impacted alarms, the results shows that the technique has successfully removed many repetitive alarms.

2) IF-OTHER tag: There are 5 versions with change tag as IFOTHER. 100% of alarms are reduced for 1/5 version, 70-99% for 2/5 versions, and 40-69% of alarms are reduced for the other 2 out of 5 versions. Since we do not have any semantic information for this change tag, PIAs having any dependence on changed conditions are conservatively reported as impacted.

3) NIF-OTHER tag: There are 37 versions with the change tag NIF-OTHER. 100% of alarms are reduced for 21/37 versions, 70-99% of alarms are reduced for 5/37 versions, 40-69% for 7/37 versions, and less than 40% for 4/37 versions. Even though we have no semantic information for this change tag, the results are satisfactory. IA is efficient as compared to WPA Assume for a version v of program, $T_{wpa}$ is the time taken by WPA and $T_{ia}$ is the time taken by IA. The percentage time reduction, $\Omega$ as defined in equation 2 below, $$\Omega = \left( \frac{T_{wpa} - T_{ia}}{T_{wpa}} \right) * 100 \qquad \text{equation 2}$$

It is observed that the time taken by incremental analysis is more for the files that have a larger number of impacted functions. This depends on the location of the change. When the change is up in the hierarchy of the call graph, i.e., closer to the entry function, the edited function have more children and hence more functions can get executed after the edited function. All such functions are marked as impacted, and re-analysis of the functions increases the time taken for DFA. Moreover, when the edited function is long (in terms of LoC), more time is taken in creating new PDG nodes. And hence the time taken to incrementally compute the PDG increases.

In the preferred embodiment for Case study 2—comparison with syntactic CIA: In this one, the static ran the tool in 2 settings: IA+semCBAR and IA+CIAR. As explained earlier, our algorithm applies semantic-based CIA when the change tag is OR tag/AND tag, for other changes, syntactic CIA is applied. Therefore, in this study we compare results only for those 66 versions where the change tags are the OR tag/AND tag.

Figure 5:
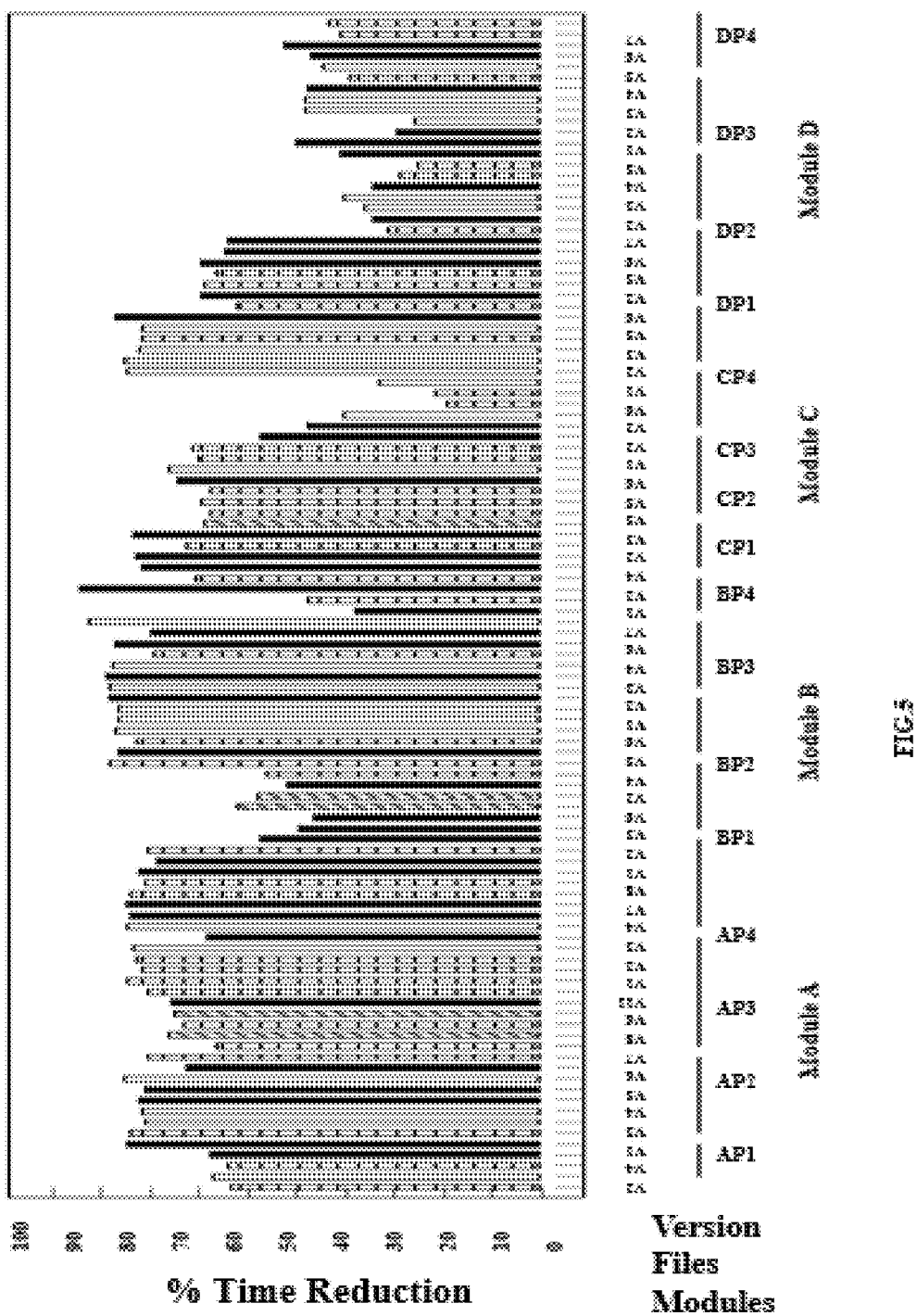
FIG. 5 is a representative example with time reduction during incremental analysis for the identified alarms of the source code when compared with whole program analysis using the system of FIG. 1 according to some embodiments of the present disclosure.

FIG. 5 is a representative example with time reduction during incremental analysis for the identified alarms of the source code when compared with whole program analysis using the system of FIG. 1 according to some embodiments of the present disclosure. FIG. 5 shows for 108 versions, the average time reduction with IA is 67%, with a maximum of 94% and a minimum of 19%. On an average, IA takes 33% of time taken by WPA. However, for 17/108 versions, the reduction in time taken by IA is less than 40% of WPA. Change-based alarm reporting detects impacted alarms more effectively than syntactic CIA Assume for a version v, $A_{wpa\_ar}$ is the number of alarms reported by WPA+AR setting and $A_{ia\_ciar}$ is the number of alarms reported by IA+CIAR setting. The percentage alarm reduction by IA+CIAR, denoted μ, is denoted below in equation 3, $$\mu = \left(\frac{(A_{wpa\_ar} - A_{ia\_ciar})}{A_{wpa\_ar}}\right) * 100 \quad \text{equation 3}$$

Figure 6:
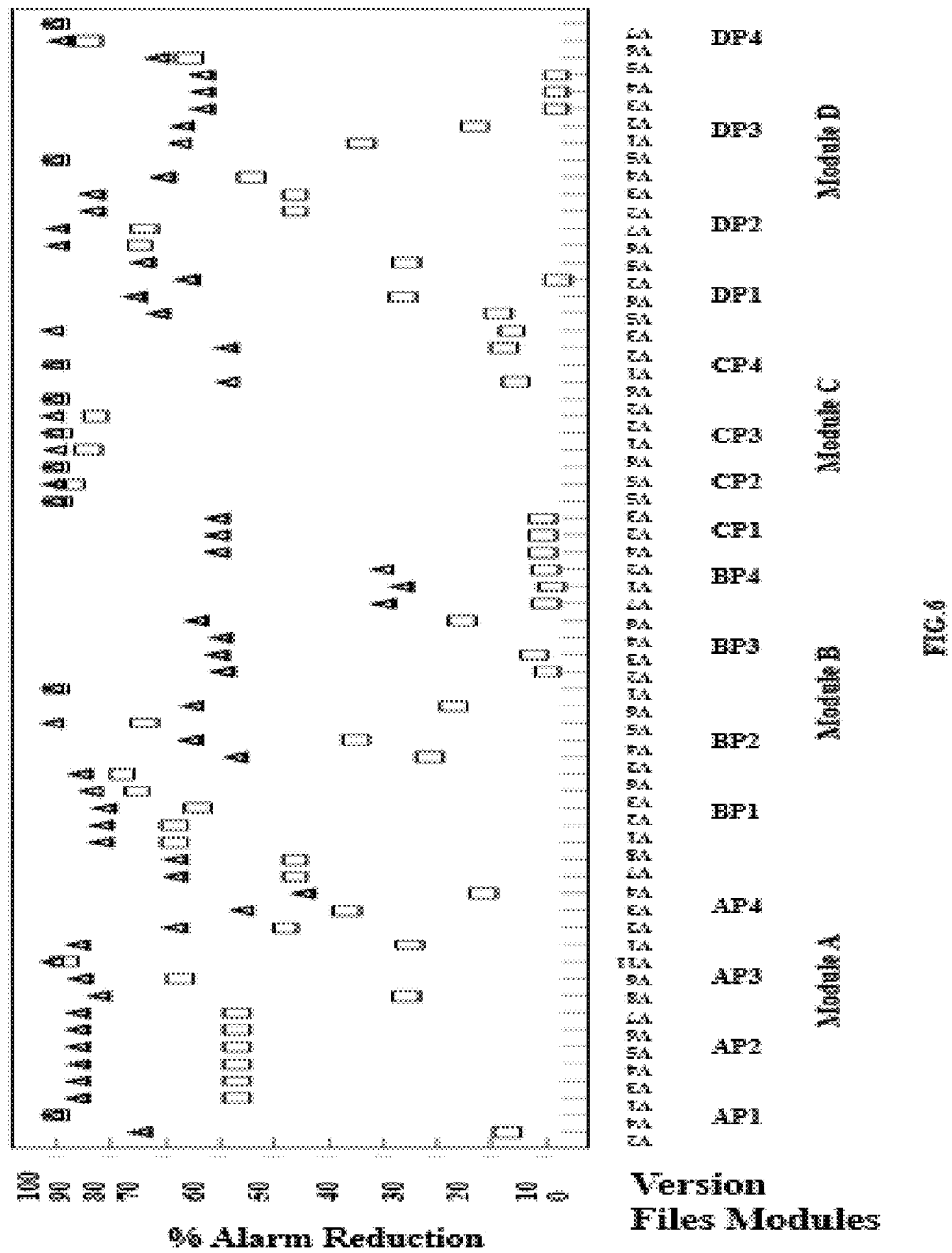
FIG. 6 is a graphical representation of the source code with identified static analysis alarms based on semantics in comparison with one existing technique (syntactic change impact analysis) derived alarms using the system of FIG. 1 according to some embodiments of the present disclosure.

FIG. 6 is a graphical representation of the source code with identified static analysis alarms based on semantics compared with various existing techniques derived alarms using the system of FIG. 1 according to some embodiments of the present disclosure. FIG. 6 shows the comparison of μ and Δ for 66 versions. Note that with IA+semCBAR the alarm reduction increased for all 59/66 versions (the remaining 7 versions had 100% alarm reduction already with CIAR). Table 7 shows the number of versions with the percentage of alarms reduced in each setting: IA+CIAR and IA+semCBAR. While IA+CIAR reduced 100% alarms in 7/66 versions, IA+semCBAR reduced 100% alarms in 12/66 versions. Number of versions with alarm reduction of 70-99% increased from 17/66 with CIAR to 40/66 with semCBAR. Whereas the number of versions with less than 40% alarm reduction were reduced from 27/66 versions with CIAR to 3/66 versions with semCBAR. On an average, semCBAR reports 62% lesser alarms than CIAR, proving that our semantic-based algorithm/method as described in the present disclosure is more effective in finding impacted alarms than syntactic CIA.

TABLE 7

Effectiveness of our semantic based CIA as compared to syntactic CIA

| | % Version with % alarm reduction | | | |
|---|---|---|---|---|
| Tool Setting | {100} | [70, 100] | [40, 70] | [0, 40] |
| IA + CIAR | 7 | 17 | 15 | 27 |
| IA + SEMCBAR | 12 | 40 | 11 | 3 |

It is picked 20 alarms randomly and observed scenarios similar to the one we have described in the example (Table 2)—the use points at line 7, 8, 11, and 12 are dependent on the change at line 2, hence CIAR reports these use points as impacted. However, semCBAR considers the change tag (OR) and identifies the use point at line 7, 8 as non-impacted and reports use points at line 11, 12 as impacted.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of identifying static analysis alarms. The embodiment, thus provides a method and system for identifying static analysis alarms based on semantics of changed source code. Moreover, the embodiments identifies the one or more impacted alarms in the analysis of evolving software systems. This is done by identifying new execution paths, and categorizing them as safe or unsafe, using semantic-based change impact analysis. The disclosed technique is integrated in the proprietary static analysis tool that automatically identifies semantics of the change, smartly performs incremental analysis, and reports only impacted alarms. The experimental evaluation on a core banking application shows that our analysis is both effective and efficient.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for identifying static analysis alarms based on semantics of changed source code, the method comprising:
    performing via one or more hardware processors, static analysis over a source code and a property of variables for the source code to be verified for identifying one or more impacted static analysis alarms;
    preprocessing, by using a difference module via the one or more hardware processors, the source code to identify one or more change program points between a current version of the source code and a previous version of the source code, and generating a line number mapping and a change tag, wherein the line number mapping is a mapping of unchanged line numbers between the current version of the source code and the previous version of the source code;
    generating, by using a front-end module, via the one or more hardware processors, the current version of the source code and the previous version of the source code, an intermediate representation (IR), an IR mapping, and an edited function, wherein the edited function is an enclosed function of changed or added IR objects for the one or more change program points mapped to an abstract syntax tree (AST);
    performing, by using a program analysis module, an incremental analysis on the one or more change program points via the one or more hardware processors to mark one or more impacted functions in the current version of the source code by reanalyzing the one or more change program points, a change tag, and the IR mapping between the current version of the source code and the previous version of the source code, and then generating a data flow analysis (DFA) and a program dependence graph (PDG) for the one or more impacted functions, wherein the incremental analysis comprises recalculating the data flow analysis (DFA) and the program dependence graph (PDG) for the one or more impacted functions, and wherein the PDG is recomputed incrementally using cached data of the previous version of the PDG and an inter procedural links with caller and callee function; and
    identifying, by using a change-based alarm identification technique by an alarm identification module the one or more impacted static analysis alarms from the one or more impacted functions in the current version of source code based on semantics of change.

2. The processor implemented method as claimed in claim 1, wherein the change tag includes a OR tag, a AND tag, IF-OTHER tag, and a NIF-OTHER tag.

3. The processor implemented method as claimed in claim 1, wherein the semantics of change is captured as the change tag.

4. The processor implemented method as claimed in claim 1, wherein the IR mapping of mapped lines are a one-to-one unique identification integer (UID) between the IR objects of the previous version of the source code and the current version of the source code.

5. The processor implemented method as claimed in claim 1, wherein the IR mapping of unmapped lines are IR objects marked as changed.

6. The processor implemented method as claimed in claim 1, wherein the data flow analysis is used at each program point as a point of interest (POI) in the source code to determine the property of variables in the source code.

7. The processor implemented method as claimed in claim 1, wherein the change-based alarm identification technique comprises:
    identifying a set of reachable program points of interest (POIs) for the one or more change program points using a control flow graph (CFG) traversal;
    determining a set of potentially impacted alarms (PIAs) by evaluating the set of reachable program points of interest (POIs) against the property to be verified using an incrementally computed DFA;
    identifying the one or more impacted static analysis alarms for the set of potentially impacted alarms (PIAs) based on at least one of an (i) OR tag, and (ii) AND tag;

checking inside a modified if statement for potentially impacted alarms (PIAs) based on a true branch condition for the OR tag, and a false branch condition for the AND tag;

evaluating the potentially impacted alarms (PIAs) outside the modified if statement for identifying the one or more impacted static analysis alarms by, checking a transitive data dependency for the set of PIAs controlled by a changed condition for the OR tag based on a set of predefined criterions, and a worklist is created for dependencies on a changed node, wherein one or more alarms are identified as impacted, if the transitive data dependency node is in a false branch of the changed condition for the OR tag, and if the transitive data dependency node is in a true branch of the changed condition for the AND tag; and determining the transitive data dependency of control dependencies on the changed node and, transitive control dependencies of data dependency on the changed node, and creating a worklist for dependencies if any of the dependencies is on the changed node, and marking the set of PIAs as the one or more impacted static analysis alarms.

8. The method as claimed in claim 7, wherein the set of predefined criterions includes reachability of (POI) is not dependent on any assignment whose reachability is dependent on the changed condition, and value of property at (POI) is not dependent on any assignment whose reachability is dependent on the changed condition.

9. A system for identifying static analysis alarms based on semantics of changed source code, comprising:
a memory storing instructions;
one or more communication interfaces; and
one or more hardware processors coupled to the memory via the one or more communication interfaces, wherein the one or more hardware processors are configured by the instructions to:

perform, static analysis over a source code and a property of variables for the source code to be verified for identifying one or more impacted static analysis alarms;

preprocess, by using a difference module for the source code, to identify one or more change program points between a current version of the source code and a previous version of the source code, and generate a line number mapping and a change tag, wherein the line number mapping is a mapping of unchanged line the source code;

generate, by using a front-end module for the current version of the source code and the previous version of the source code, an intermediate representation (IR), an IR mapping, and an edited function, wherein an edited function is an enclosed function of changed or added IR objects for the one or more change program points mapped to an abstract syntax tree (AST);

perform, by using a program analysis module, an incremental analysis based on the one or more change program points to mark one or more impacted functions in the current version of the source code by reanalyzing the one or more change program points, a change tag, and the IR mapping between the current version of the source code and the previous version of the source code, and then generating a data flow analysis (DFA) and a program dependence graph (PDG) for the one or more impacted functions, wherein the incremental analysis comprises recalculating the data flow analysis (DFA) and the program dependence graph (PDG) for the one or more impacted functions, and wherein the PDG is recomputed incrementally using cached data of the previous version of the PDG and an inter procedural links with caller and callee function; and identify, by using an alarm identification module, using a change-based alarm identification technique, the one or more impacted static analysis alarms from the one or more impacted functions in the current version of source code based on semantics of change.

10. The system of claim 9, wherein the change tag includes a OR tag, a AND tag, IF-OTHER tag, and a NIF-OTHER tag.

11. The system of claim 9, wherein the IR mapping of mapped lines are a one-to-one unique identification integer (UID) between the IR objects of the previous version of the source code and the current version of the source code, wherein the IR mapping of unmapped lines are IR objects marked as changed.

12. The system of claim 9, wherein the change-based alarm identification technique comprises:

identifying a set of reachable program points of interest (POIs) for the one or more change program points using a control flow graph (CFG) traversal;

determining a set of potentially impacted alarms (PIAs) by evaluating the set of reachable program points of interest (POIs) against the property to be verified using an incrementally computed DFA;

identifying the one or more impacted static analysis alarms for the set of potentially impacted alarms (PIAs) based on at least one of an (i) OR tag, and (ii) AND tag;

checking inside a modified if statement for potentially impacted alarms (PIAs) based on a true branch condition for the OR tag, and a false branch condition for the AND tag;

evaluating the potentially impacted alarms (PIAs) outside the modified if statement for identifying the one or more impacted static analysis alarms by, checking a transitive data dependency for the set of PIAs controlled by a changed condition for the OR tag based on a set of predefined criterions, and a worklist is created for dependencies on a changed node, wherein one or more alarms are identified as impacted, if the transitive data dependency node is in a false branch of the changed condition for the OR tag, and if the transitive data dependency node is in a true branch of the changed condition for the AND tag; and determining the transitive data dependency of control dependencies on the changed node and, transitive control dependencies of data dependency on the changed node, and creating a worklist for dependencies if any of the dependencies is on the changed node, and marking the set of PIAs as the one or more impacted static analysis alarms.

13. The system of claim 12, wherein the set of predefined criterions includes reachability of (POI) is not dependent on any assignment whose reachability is dependent on the changed condition, and value of property at POI is not dependent on any assignment whose reachability is dependent on the changed condition.

14. One or more non-transitory machine-readable information storage mediums comprising one or more instructions which when executed by one or more hardware processors perform actions comprising:

performing, static analysis over a source code and a property of variables for the source code to be verified for identifying one or more impacted static analysis alarms;

preprocessing, by using a difference module for the source code, to identify one or more change program points between a current version of the source code and a previous version of the source code, and generating a line number mapping and a change tag, wherein the line number mapping is a mapping of unchanged line numbers between the current version of the source code and the previous version of the source code;

generating, by using a front-end module for the current version of the source code and the previous version of the source code, an intermediate representation (IR), an IR mapping, and an edited function, wherein an edited function is an enclosed function of changed or added IR objects for the one or more change program points mapped to an abstract syntax tree (AST);

performing, by using a program analysis module, an incremental analysis based on the one or more change program points to mark one or more impacted functions in the current version of the source code by reanalyzing the one or more change program points, a change tag, and the IR mapping between the current version of the source code and the previous version of the source code, and then generating a data flow analysis (DFA) and a program dependence graph (PDG) for the one or more impacted functions, wherein the incremental analysis comprises recalculating the data flow analysis (DFA) and the program dependence graph (PDG) for the one or more impacted functions, and wherein the PDG is recomputed incrementally using cached data of the previous version of the PDG and an inter procedural links with caller and callee function; and identifying, by using an alarm identification module, using a change-based alarm identification technique, the one or more impacted static analysis alarms from the one or more impacted functions in the current version of source code based on semantics of change.

15. The one or more non-transitory machine-readable information storage mediums of claim 14, wherein the change-based alarm identification technique comprises:

identifying a set of reachable program points of interest (POIs) for the one or more change program points using a control flow graph (CFG) traversal;

determining a set of potentially impacted alarms (PIAs) by evaluating the set of reachable program points of interest (POIs) against the property to be verified using an incrementally computed DFA;

identifying the one or more impacted static analysis alarms for the set of potentially impacted alarms (PIAs) based on at least one of an (i) OR tag, and (ii) AND tag;

checking inside a modified if statement for potentially impacted alarms (PIAs) based on a true branch condition for the OR tag, and a false branch condition for the AND tag;

evaluating the potentially impacted alarms (PIAs) outside the modified if statement for identifying the one or more impacted static analysis alarms by, checking a transitive data dependency for the set of PIAs controlled by a changed condition for the OR tag based on a set of predefined criterions, and a worklist is created for dependencies on a changed node, wherein one or more alarms are identified as impacted, if the transitive data dependency node is in a false branch of the changed condition for the OR tag, and if the transitive data dependency node is in a true branch of the changed condition for the AND tag; and determining the transitive data dependency of control dependencies on the changed node and, transitive control dependencies of data dependency on the changed node, and creating a worklist for dependencies if any of the dependencies is on the changed node, and marking the set of PIAs as the one or more impacted static analysis alarms.

16. The one or more non-transitory machine-readable information storage mediums of claim 14, wherein the IR mapping of mapped lines are a one-to-one unique identification integer (UID) between the IR objects of the previous version of the source code and the current version of the source code, wherein the IR mapping of unmapped lines are IR objects marked as changed.

17. The one or more non-transitory machine-readable information storage mediums of claim 14, wherein the change tag includes a OR tag, a AND tag, IF-OTHER tag, and a NIF-OTHER tag.

18. The one or more non-transitory machine-readable information storage mediums of claim 14, wherein the set of predefined criterions includes reachability of (POI) is not dependent on any assignment whose reachability is dependent on the changed condition, and value of property at POI is not dependent on any assignment whose reachability is dependent on the changed condition.

* * * * *